United States Patent
Laurello et al.

(10) Patent No.: US 6,786,488 B2
(45) Date of Patent: Sep. 7, 2004

(54) SEAL STRUCTURE, TURBINE HAVING THE SAME, AND LEAK-PREVENTING SEAL SYSTEM FOR ROTATING SHAFT

(75) Inventors: Vincent Laurello, Miami, FL (US); Masanori Yuri, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/197,581

(22) Filed: Jul. 18, 2002

(65) Prior Publication Data

US 2004/0012149 A1 Jan. 22, 2004

(51) Int. Cl.⁷ .............................................. F16J 15/44
(52) U.S. Cl. ...................... 277/355; 277/412; 277/415; 277/421
(58) Field of Search ................................ 277/355, 412, 277/413, 421, 415

(56) References Cited

U.S. PATENT DOCUMENTS

| | | | |
|---|---|---|---|
| 5,603,510 A | * 2/1997 | Sanders | 277/413 |
| 6,131,911 A | 10/2000 | Cromer et al. | |
| 6,308,958 B1 | * 10/2001 | Turnquist et al. | 277/355 |
| 6,402,157 B1 | * 6/2002 | Zhou et al. | 277/355 |
| 6,416,057 B1 | * 7/2002 | Adams et al. | 277/355 |
| 6,502,823 B1 | * 1/2003 | Turnquist et al. | 277/355 |
| 6,502,824 B2 | * 1/2003 | Mayer et al. | 277/355 |
| 6,505,834 B1 | * 1/2003 | Dinc et al. | 277/355 |
| 6,533,284 B2 | * 3/2003 | Aksit et al. | 277/355 |
| 6,547,257 B2 | * 4/2003 | Cromer | 277/630 |
| 6,547,522 B2 | * 4/2003 | Turnquist et al. | 415/173.3 |
| 6,550,777 B2 | * 4/2003 | Turnquist et al. | 277/355 |
| 6,572,115 B1 | * 6/2003 | Sarshar et al. | 277/412 |
| 6,601,853 B2 | * 8/2003 | Inoue | 277/355 |

FOREIGN PATENT DOCUMENTS

| | | |
|---|---|---|
| JP | 11-336506 | 12/1999 |
| JP | 11-344122 | 12/1999 |

* cited by examiner

Primary Examiner—Daniel P. Stodola
Assistant Examiner—Carlos Lugo
(74) Attorney, Agent, or Firm—Oblon, Spivak, McClelland, Maier & Neustadt, P.C.

(57) ABSTRACT

In order to decrease gas leakage and in order to restrict the friction between the brush and the rotating shaft, a seal structure for a rotating shaft comprises a stator section, a rotating shaft, a groove, a brush, a spring member, and a connecting hole induces fluid pressure which presses the ring in a direction in which the ring approaches to the rotating shaft so as to be against the spring force of the spring member and make the brush contact the inner surface of the stator, the sealing structure prevents the fluid from flowing between the rotating shaft and the stator having a clearance from the surface of the rotating shaft and flowing in an axial direction of the rotating shaft.

6 Claims, 7 Drawing Sheets

(HIGH PRESSURE REGION)    (LOW PRESSURE REGION)

SEAL STRUCTURE, TURBINE HAVING THE SAME, AND LEAK-PREVENTING SEAL SYSTEM FOR ROTATING SHAFT

BACKGROUND OF THE INVENTION

1. Field of the Invention

The present invention relates to a seal structure which is favorable for a rotating shaft of a steam turbine and relates to a turbine using the same.

2. Description of Related Art

Around a rotating shaft of gas turbine and a steam turbine, a seal structure for rotating shaft is employed so as to prevent gas from leaking from the high pressure region to a low pressure region. As an example of the seal structure for a rotating shaft, a brush seal 1 can be mentioned as shown in FIG. 6.

The brush seal 1 comprises a ring 3 which is disposed around the outer periphery of a rotating shaft 2 and a brush 4 made of a plurality of wires disposed on the inner surface of the ring 3. The ring 3 is fixed on the stator 5, such as casing, which surrounds an outer periphery of the rotating shaft 2. The brush 4 has appropriate rigidity and is disposed densely in a rotational direction of the rotating shaft 2 as shown in FIG. 7. Also, a brush 4 is disposed so as to form an acute angle with the rotational surface of the rotating shaft 2, and the brush 4 is disposed in slanted form in a rotational direction of the rotating shaft 2 (in a direction of an arrow d in the drawing). Between the tip of the brush 4 and a rotational surface 6 of the rotating shaft 2, a space is provided.

This space becomes gradually smaller when the rotating shaft 2 rotates and a diameter of the rotating shaft 2 increases due to centrifugal force. The tip of the brush 4 contacts the rotational surface 6 of the rotating shaft 2 with a predetermined pressure before a turbine operates in a load condition as shown in FIG. 8 (during low speed rotation of the rotating shaft 2). By this contact, a brush seal 1 prevents gas from passing between the rotating shaft 2 and the stator 5 and leaking from a high pressure region to a low pressure region.

When a turbine operates in a load condition (in high speed rotation of the rotating shaft 2), high temperature gas flows in between the rotating shaft 2 and the stator 5 from the combustor. Also, cooling air flows to the rotating shaft 2 so as to restrict heat due to this gas. For that purpose, the temperature of the rotating shaft 2 is maintained to almost the same temperature as the temperature of the cooling air. In contrast, because cooing air does not flow to the stator 5, the temperature of the stator 5 and the ring 3 become nearly the same as the temperature of the gas. Therefore, the temperature of the stator 5 and the ring 3 become higher than the temperature of the rotating shaft 2. Thus, the enlargement of the diameter of the stator 5 and the ring 3 due to thermal expansion becomes larger than the enlargement of the diameter of the rotating shaft 2 due to thermal expansion and centrifugal force. As a result, the ring 3 expands in outer radial direction so as to depart from the rotating shaft 2. When the ring 3 departs from the rotating shaft 2, the tip of the brush 4 departs from the rotational surface 6 of the rotating shaft 2, and a space g is generated between the brush 4 and the rotational surface 6 as shown in FIG. 9.

As described above, in brush seal 1, gas passes through the space g and leaks to the low pressure region; thus, the function of sealing effect decreases because the space g is generated between the brush 4 and the rotational surface 6 when a turbine 22 operates in a load condition. When the seal effect decreases, driving force loss is generated in a turbine.

Also, the tip of the brush 4 of the above brush seal 1 slides on the rotational surface 5 of the rotating shaft 2 when a turbine 22 operates in a non-load condition. Therefore, the friction between the brush 4 and the rotational surface 6 of the rotating shaft 2 is large; thus, the service life of the brush seal is shortened.

SUMMARY OF THE INVENTION

The present invention was made in consideration of the above situation. An object of the present invention is to decrease the amount of gas leaking from high pressure region to a low pressure region when a turbine operates in a load condition, and another object of the present invention is to provide a seal structure for a rotating shaft and a turbine which is provided with such a seal structure.

In order to achieve the above objects, a seal structure for a rotating shaft according to a first aspect of the present invention is characterized in comprising a stator section, a rotating shaft, a groove formed on an inner surface of the stator section, a ring made of a plurality of portions formed in a circle and disposed in the groove, a brush composing a plurality of wires adhered on an inner surface of the ring and tips of the wires are disposed toward the surface of the inner surface, a spring member which pushes the ring in a direction in which the ring departs from the rotating shaft so as to float the brush from the inner surface of the stator and a connecting hole inducts fluid pressure which presses the ring in a direction in which the ring approaches to the rotating shaft so as to be against the spring force of the spring member and make the brush contact the inner surface of the stator wherein the sealing structure prevents the fluid from passing between the rotating shaft and the stator having a clearance from the surface of the rotating shaft and flowing in an axial direction of the rotating shaft.

In this seal structure for a rotating shaft, when the space between the rotating shaft and the stator does not need to be sealed (for example, before a turbine operation reaches its load condition), the brush and the rotational surface are maintained uncontacted by separating the ring from the rotating shaft with a spring force of the spring member so as to float the brush from the rotational surface of the rotating shaft. By doing this, when sealing effect is not necessary, the friction between the brush and the rotating shaft is prevented. When the space between the rotating shaft and the stator must be sealed (for example when a turbine operates in a load condition), the tip of the brush contacts the rotational surface of the rotating shaft by inducting a fluid pressure from connecting holes so as to be against the spring force of the spring member and by moving the ring with such fluid pressure in a direction in which the ring approaches to the rotating shaft. By doing this, when sealing effect is necessary, the fluid is prevented from flowing through the rotating shaft and the stator and leaking from an upstream region (high pressure region) to a down stream region (low pressure region).

A sealing structure for a rotating shaft according to a second aspect of the present invention is characterized in having a pressure inducting device which inducts the fluid pressure to the connecting hole.

In such a seal structure for a rotating shaft, features such as restricting the friction between the brush and the rotating shaft and the leak of the fluid from the upstream region to the downstream region are the same as the features described above.

A sealing structure for a rotating shaft according to a third aspect of the present invention, in a sealing structure for a rotating shaft in the first or the second aspect of the present invention, is characterized in that the spring member is disposed separately near the upstream of the fluid and near the downstream of the fluid so as to position the brush therebetween.

In such a seal structure for a rotating shaft, the spring member supports the ring at two points in the upstream region and the downstream region while having the brush therebetween. Therefore, no force other than the spring force by the spring member is given to the ring from the upstream region or from the downstream region; thus, inclination of the ring in the groove is prevented and the ring floats stably in the groove. When sealing effect is not necessary, the contact between the brush and the rotating shaft is avoided, and also the friction between the brush and the rotating shaft is restricted. By doing this, fatigue life of the brush seal can be extended.

A sealing structure for a rotating shaft according to a fourth aspect of the present invention, in a sealing structure for a rotating shaft according to the third aspect of the present invention, is characterized in that the spring force of one spring member disposed near the upstream of the fluid is greater than the spring force of the other spring member disposed near the downstream of the fluid at a brush as a borderline.

In such a sealing structure for a rotating shaft, the fluid which flows in an axial direction of the rotating shaft pushes the ring from the upstream region to the downstream region so as to press strongly an upstream portion of the ring by a spring member; thus, a portion of the ring is prevented from being disposed at a slant toward the upstream region. Therefore, when the fluid flows in an axial direction of the rotating shaft, no portion of the ring vibrates, and no portion of the ring is fixed slanted in the groove. Also, each portion of the ring moves smoothly in a direction in which each portion of the ring approaches to the rotating shaft due to the fluid pressure which is induced from the connecting hole. Therefore, when sealing effect is necessary, the fluid is prevented from flowing through between the rotating shaft and the stator and leaking from a high pressure region to a low pressure region.

A sealing structure for a rotating shaft according to a fifth aspect of the present invention, in any one of the first to the fourth aspects of the present invention, is characterized in that a seal member is disposed so as to seal between the ring and the groove.

In such a sealing structure, the fluid which is inducted from the connecting hole and the fluid which enters in the groove are surrounded by the sealing member; thus, the fluid does not flow between the stator and the ring and does not leak to the downstream region. By doing this, the sealing effect can be favorably maintained.

A turbine according to a sixth aspect of the present invention is characterized in being provided with a seal structure for a rotating shaft according to any one of the first to the fifth aspects of the present invention wherein the turbine converts thermal energy to mechanical rotary energy so as to generate dynamic force by blowing high temperature high pressure fluid to rotors disposed on the rotating shaft so as to rotate the rotors around the rotating shaft.

In a load operation of such a turbine, the amount of fluid which flows through between the rotating shaft and the stator and leaks can be decreased. By doing this, the generation of the loss of the driving force of the turbine can by prevented.

A leak-preventing seal system for a rotating shaft according to a seventh aspect of the present invention is characterized in comprising a ring made of a plurality of circular portions which is disposed on a rotor and has the rotating shaft therethrough, a ring made of a plurality of portions formed in a circle and disposed in the groove, a brush composing a plurality of wires attached to the inner surface of the ring and the tips of the wires are disposed toward the surface of the inner surface a spring member which pushes the ring in direction in which the ring departs from the rotating shaft and a connecting hole induces fluid pressure which presses the ring in a direction in which the ring approaches to the rotating shaft so as to be against the spring force of the spring member. Also, the leak-preventing seal system for a rotating shaft prevents the fluid from flowing between the rotating shaft and the stator having a clearance from the surface of the rotating shaft and leaking in axial direction of the rotating shaft, the leak-preventing seal system for rotating shaft supplies the fluid pressure to the connecting hole when sealing the clearance and stops the supply of the fluid pressure to the connecting hole when releasing the sealing of the clearance.

In such a leak-preventing seal system for rotating shaft, features such as restricting the friction between the brush and the rotating shaft and the leak of the fluid from the upstream region to the downstream region are the same as the features described in the first aspect of the present invention.

As explained above, according to a turbine which is provided with a seal structure for a rotating shaft and a turbine provided with such structure, the following effects can be obtained.

By a seal structure for a rotating shaft according to the first or the second aspect of the present invention, when a space between a rotating shaft and a stator need not be sealed, a brush floats from a rotational surface of the rotating shaft by separating the ring from the rotating shaft by a spring force of a spring member; thus, the brush and the rotational surface are maintained uncontacted, and friction between the brush and the rotating shaft can be prevented. By doing this, service life of sealing function for a rotating shaft can be extended. When a space between the rotating shaft and the stator must be sealed, by inducing the fluid pressure from the connecting hole so as to oppose the spring force of the spring member and moving the ring in a direction in which the ring approaches the rotating shaft by the fluid pressure; thus, the tip of the brush contacts the rotational surface of the rotating shaft; therefore, the fluid flow between the rotating shaft and the stator and leaks in an axial direction of the rotating shaft can be prevented.

Therefore, if a seal structure for a rotating shaft according to the first or the second aspect of the present invention is used for a turbine, when a turbine operates in a no-load condition, the contact between the rotating shaft and the brush can be avoided. When the turbine operates in a load condition, the fluid flow between the rotating shaft and the stator and leaks can be prevented. Thus, it becomes possible to extend the service life of the seal structure for a rotating shaft and prevent the occurrence of the loss of the driving force of the turbine.

By a seal structure for a rotating shaft according to the third aspect of the present invention, the ring does not vibrate nor slant in the groove section. Thus the ring floats stably. When it is not necessary to seal a space between the rotating shaft and the stator, the contact between the brush and the rotating shaft can be reliably avoided. By doing this, the service life of the seal structure can be extended.

By a seal structure for a rotating shaft according to the fourth aspect of the present invention, by giving a spring force to a part of a portion which is nearer to an upstream region by a spring member, the fluid flowing in an axial direction of the rotating shaft compresses the ring from the upstream region toward downstream region; thus, the portion is prevented from slanting toward upstream region. Thus, when it is necessary to seal a space between the rotating shaft and the stator, the brush and the rotating shaft contact stably. By doing this, it becomes possible to prevent the occurrence of the loss of the driving force in a turbine which is provided with a seal structure for a rotating shaft.

By a seal structure for a rotating shaft according to the fifth aspect of the present invention, the fluid which is inducted from the connecting hole and the fluid which intrudes into the groove section from flowing between the stator and the ring so as to leak to the downstream region can be prevented by the sealing member. Thus, the sealing effect can be maintained favorably. By doing this, the occurrence of the loss of the driving force can be prevented in a turbine provided with a seal structure for a rotating shaft.

By a seal structure for a rotating shaft according to the sixth aspect of the present invention, when a turbine operates in a load condition, the fluid flow between the rotating shaft and the stator and leaks can be prevented. By doing this, the occurrence of the loss of the driving force can be prevented in a turbine.

By a leak-preventing seal system for rotating a shaft according to the seventh aspect of the present invention, seal effect can be switched such as on/off selection according to the necessity of sealing a space between the rotating shaft and the stator. Therefore, for example, when a turbine operates in no load condition in which sealing effect is not necessary, the contact between the rotating shaft and the brush can be avoided, and when a turbine operates in a load condition in which sealing effect is necessary, the fluid flow between the rotating shaft and the stator and leaks can be prevented; thus it becomes possible to extend the service life of the seal structure for a rotating shaft and prevent the occurrence of the loss of the driving force of the turbine.

DETAILED DESCRIPTION OF THE INVENTION

Embodiments of the turbine which is provided with a seal structure and a turbine having such sealing structure are explained as follows. The present invention is not limited to the following embodiments. In addition, a turbine according to the present invention is explained with reference to a gas turbine. A turbine according to the present invention can be applied to other turbines such as a steam turbine.

Figure 1:
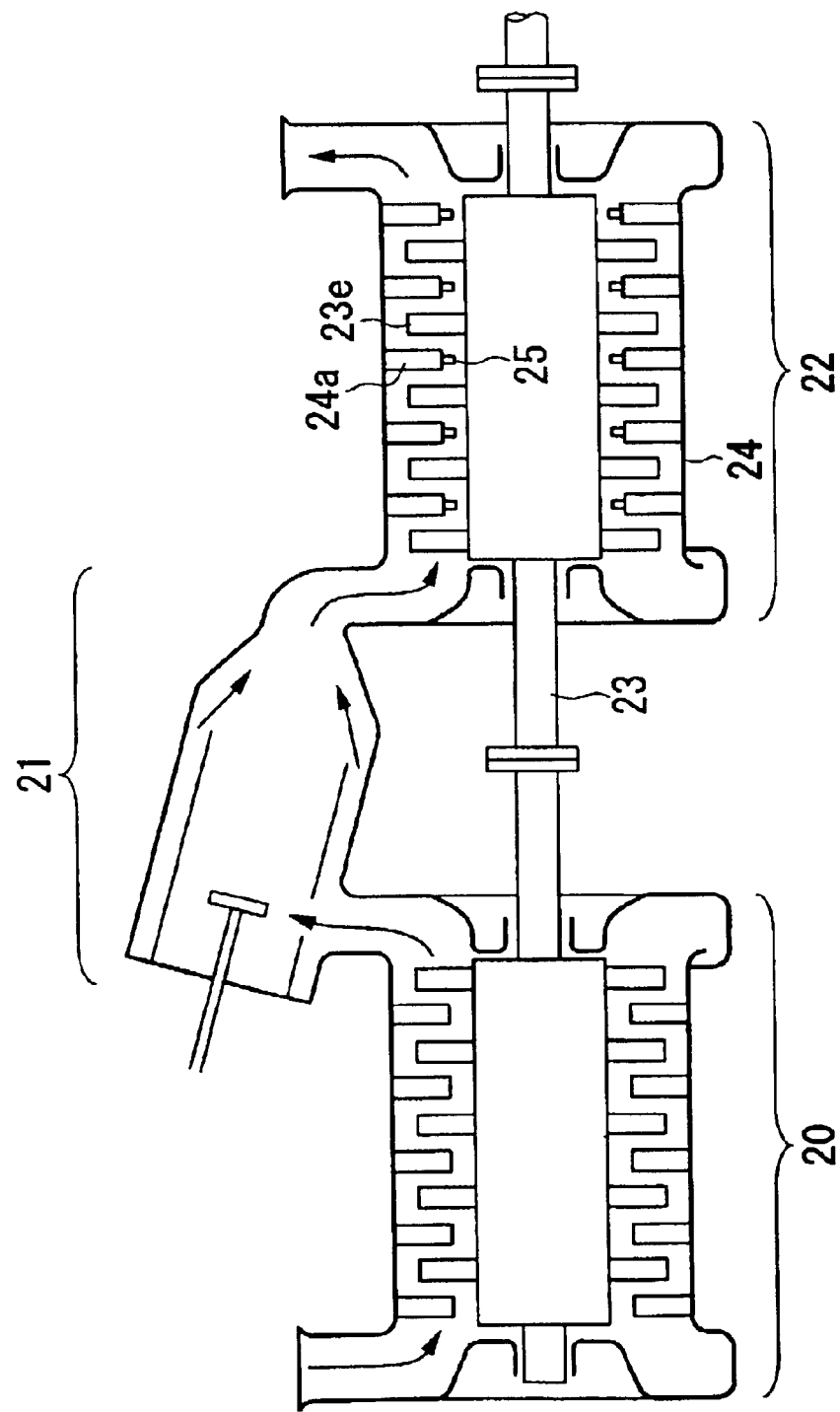
FIG. 1 is a view showing a general structure of a gas turbine which is provided with a seal structure for a rotating shaft according to the present invention.

FIG. 1 is a view showing a general structure of a gas turbine. In the drawing, reference numeral 20 indicates a compressor. Reference numeral 21 indicates a combustor. Reference numeral 22 indicates a turbine. A compressor 20 takes in a great amount of air and compresses the air. In a gas turbine, a part of the driving force which is gained by the rotating shaft 23 which is to be mentioned later is utilized for a driving force for the compressor 20. A combustor 21 mixes the air which is compressed in the compressor 20 and fuel, and combusts the mixture of air and fuel. A turbine 22 inducts the combustion gas (fluid) which is generated in the combustor 21 thereinto and expands the combustion gas. The combustion gas is blown to the rotors 23e which are fixed on the rotating shaft 23 so as to rotate the rotating shaft 23; thus, the thermal energy is converted to mechanical rotary energy, and a driving force is generated.

In a turbine 22, in addition to a plurality of rotors 23e which are fixed on the rotating shaft 23, plural stators (stator sections) 24a are provided. The stators 24a are fixed on a casing 24. The rotors 23e and the stators 24a are disposed alternatingly in an axial direction of the rotating shaft 23. The rotors 23e rotates the rotating shaft 23 by receiving the pressure of gas which flows in an axial direction of the rotating shaft 23. Between the stators 24a and the rotating shaft 23, a brush seal 25 is disposed. The brush seal 25 prevents gas from passing through a circular space between the stators 24a and the rotating shaft 23 and flowing from a high pressure region to a low pressure region.

Figure 2:
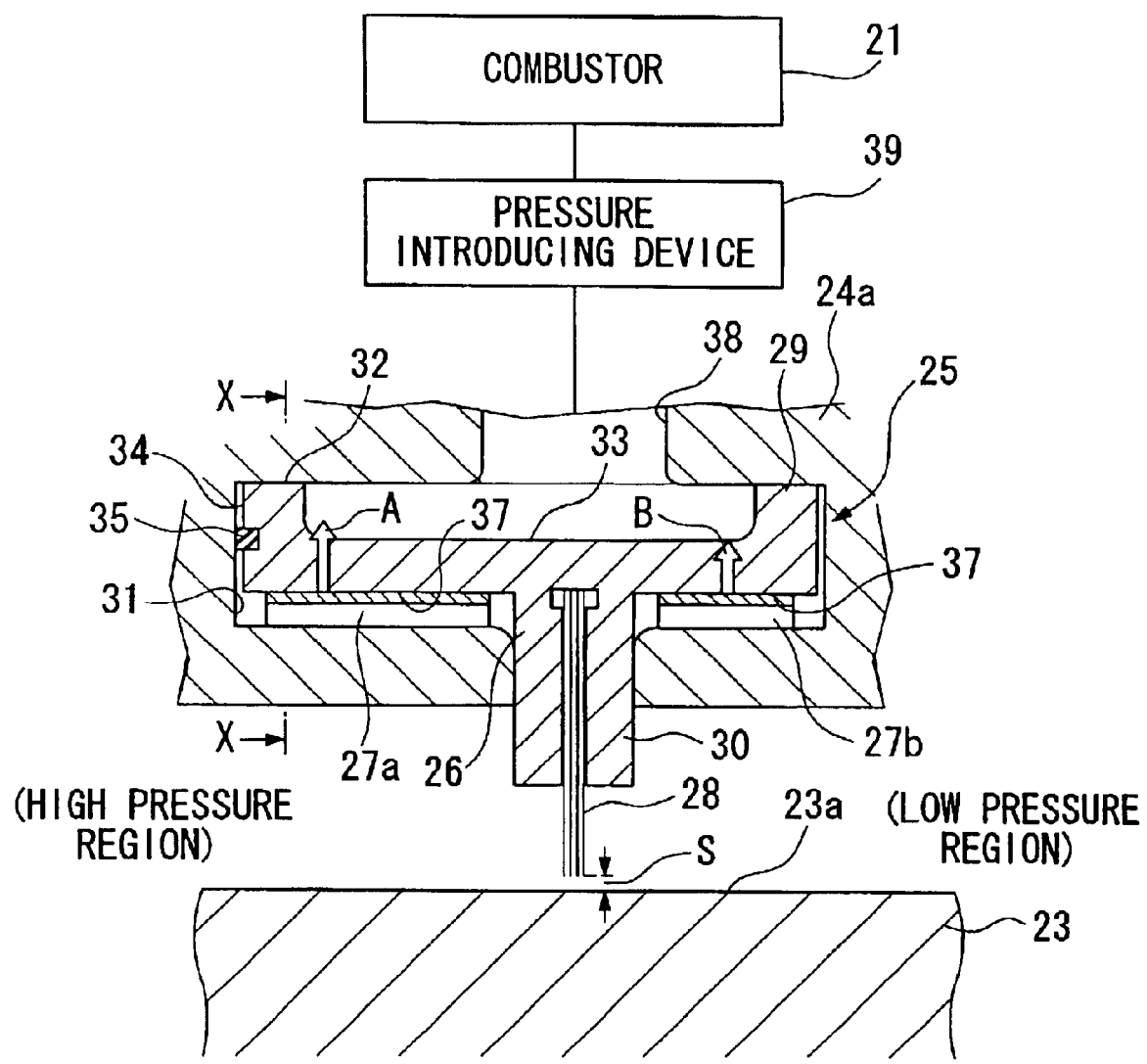
FIG. 2 is a cross section showing a brush seal (shaft seal structure) of an embodiment viewed along a surface which is parallel with a longitudinal direction of the rotating shaft.

FIG. 2 is a cross section showing a brush seal 25 during the stoppage of the rotating shaft 23 viewed along a surface which is parallel with a longitudinal direction of the rotating shaft 23. A brush seal 25 has a circular ring 26, plate springs 27a and 27b (spring members) which provides spring force to the ring 26, and a brush 28 which is disposed on an inner periphery of the ring 26. The outer peripheral section 29 of the ring 26 projects in an axial direction of the rotating shaft 23. The inner peripheral section 30 of the ring 26 projects toward the rotational surface 23a of the rotating shaft 23 with a T-shaped groove 31 in its cross section. The outer peripheral section 29 is engaged with the groove 31 which is formed so as to be circular in a circular direction of the inner periphery of the stators 24a. A high pressure region (upstream region of gas) of the outer peripheral section 29 is formed longer than a low pressure region (downstream region) in an axial direction of the rotating shaft 23 at a border such as brush 28. On an upper surface 32 of the outer peripheral section 29, a pressure receiving section 33 having a groove shape which is wide in an axial direction of the rotating shaft 23 is formed. Also, on a surface 34 near high pressure region of the outer peripheral section 29, a seal member 35 is disposed so as to seal between the surface 34 near a high pressure region and the groove section 31. The tip of the inner peripheral section 30 of the ring 26 projects from the groove section 31 of the stator 24a.

Plate springs 27a and 27b are disposed between the stators 24a and a bottom surface 37 of the outer peripheral section 29 of the ring 26. The plate springs 27a and 27b are disposed separately in a high pressure region and in a low pressure region with a brush 28 therebetween. Spring force of the plate spring 27a which is disposed in a high pressure region is stronger than a spring force of the other plate spring 27b which is disposed in a low pressure region. The plate springs 27a and 27b provide spring force to the ring 26 so as to be in a direction in which the ring 26 departs from the rotating shaft 23 (in a direction indicated by an arrow A and an arrow B in the drawing), the upper surface 32 of the outer peripheral section 29 of the ring 26 contacts an upper surface of the groove section 31.

A brush 28 is made of a plurality of wires having appropriate rigidity. The root part of the brush 28 is disposed in almost the center of the inner peripheral section 30 of the ring 26, and the tip of the brush 28 faces toward the peripheral section 23a of the rotating shaft 23. Also, the tip of the brush 28 floats on a rotational surface 23a of the rotating shaft 23 having a predetermined clearance "s" while the upper surface 32 of the ring 26 contacts the upper surface of the groove section 31. As described above, when the rotating shaft 23 is stopped, the brush 28 and the rotational surface 23a of the rotating shaft 23 do not contact. On a stator 24a, a connecting hole 38 which communicates the pressure receiving section 33 of the ring 26 is formed. To the connecting hole 38 a pressure induction device 39 which supplies pressurized air according to necessity is connected.

Figure 3:
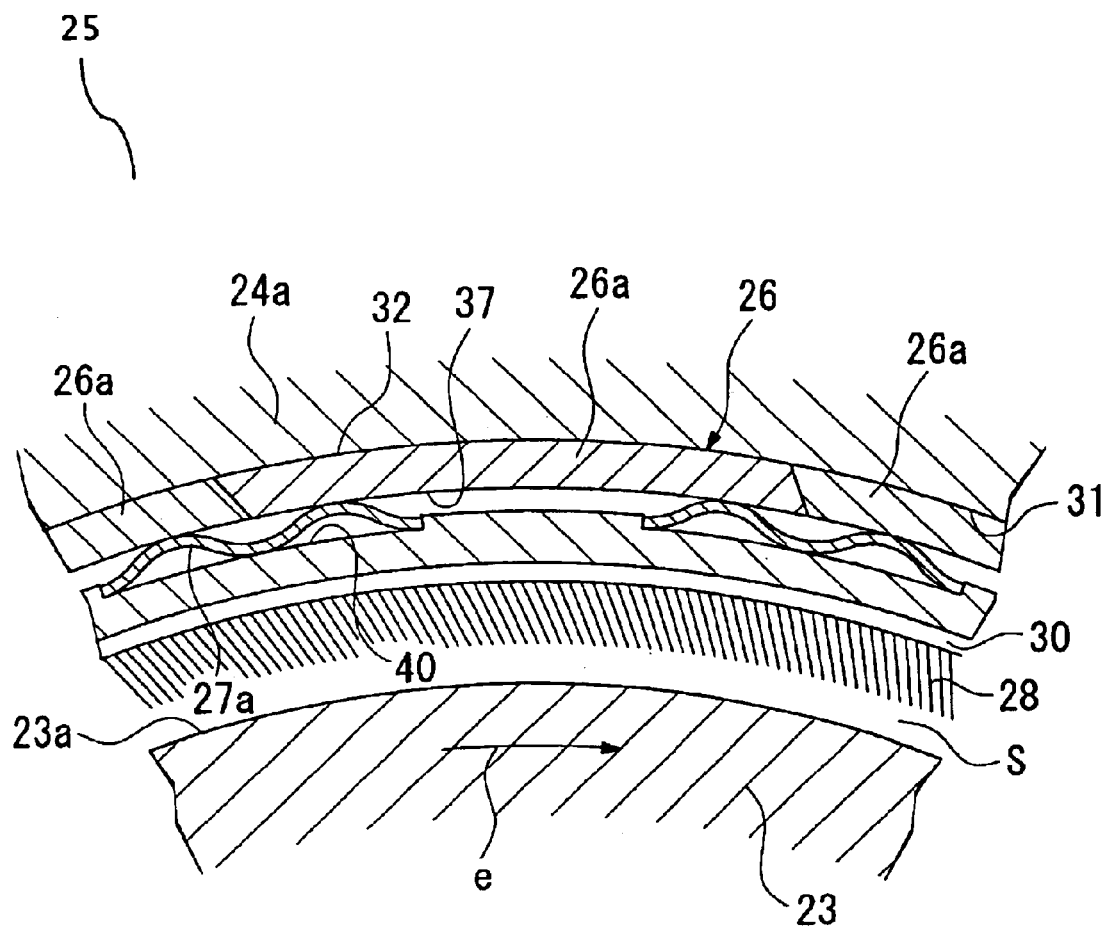
FIG. 3 is a cross section showing a brush seal according to the present embodiment taken along line X—X in FIG. 2.

FIG. 3 is a cross section showing a brush seal 25 taken along line X—X of FIG. 2. As shown in the drawing, the ring 26 is made of a plurality of portions 26a which are divided in a circular direction of the ring. The portions 26a are disposed in a circular direction of the rotating shaft 23 inside the groove section 31. The brush 28 is disposed densely without any space therebetween in a circular direction of the rotating shaft 23. Also, the brush 28 is attached in slanted form in a rotary direction of the rotating shaft 23 (in a direction indicated by an arrow e in the drawing) having an acute angle with a rotational surface 23a of the rotating shaft 23. The plate spring 27a is disposed in the groove 40 formed in the groove section 31. In a circular direction of the rotating shaft 23, a plurality of groove 40 and a plurality of plate springs 27a are disposed with a predetermined interval therebetween. Also, a plurality of plate springs 27b are disposed in the same manner as the plate springs 27a.

Next, an operation of the brush seal 25 in an operation of the turbine 22 is explained as follows. When a turbine 22 is driven, gas from the combustor 21 flows between the rotating shaft 23 and the stators 24a, the rotating shaft 23 starts rotating. Diameter of the rotating shaft 23 is enlarged due to the centrifugal force. Because of this, the space "s" between the rotational surface 23a of the rotating shaft 23 and the brush 28 becomes gradually narrower. However, this brush seal 25 is different from a conventional brush seal in that the space "s" is formed to be relatively large so as to avoid the space "s" between the brush 28 and the rotational surface 23a of the rotating shaft 23 to close even if the rotating shaft 23 approaches the stator 24a most closely while the rotating shaft rotates at low speed (in no load operation of the turbine 22). Therefore, when the turbine 22 is operated in a no-load condition, the brush 28 and the rotational surface 23a of the rotating shaft 23 do not contact as similar to the case of stoppage of the rotating shaft 23.

Figure 4:
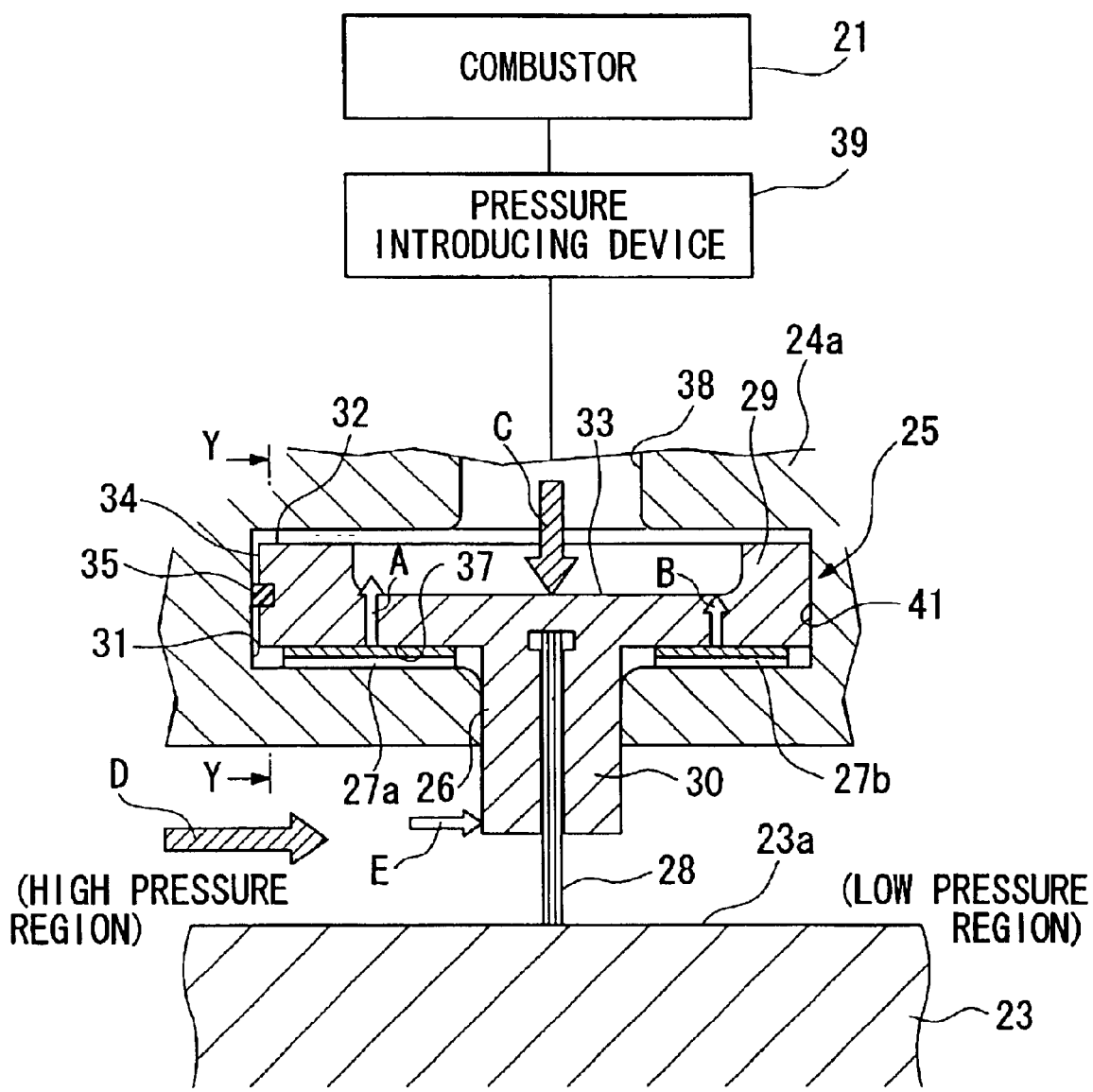
FIG. 4 is a cross section showing a brush seal according to the present embodiment viewed along a surface which is parallel with a longitudinal direction of the rotating shaft.
Figure 5:
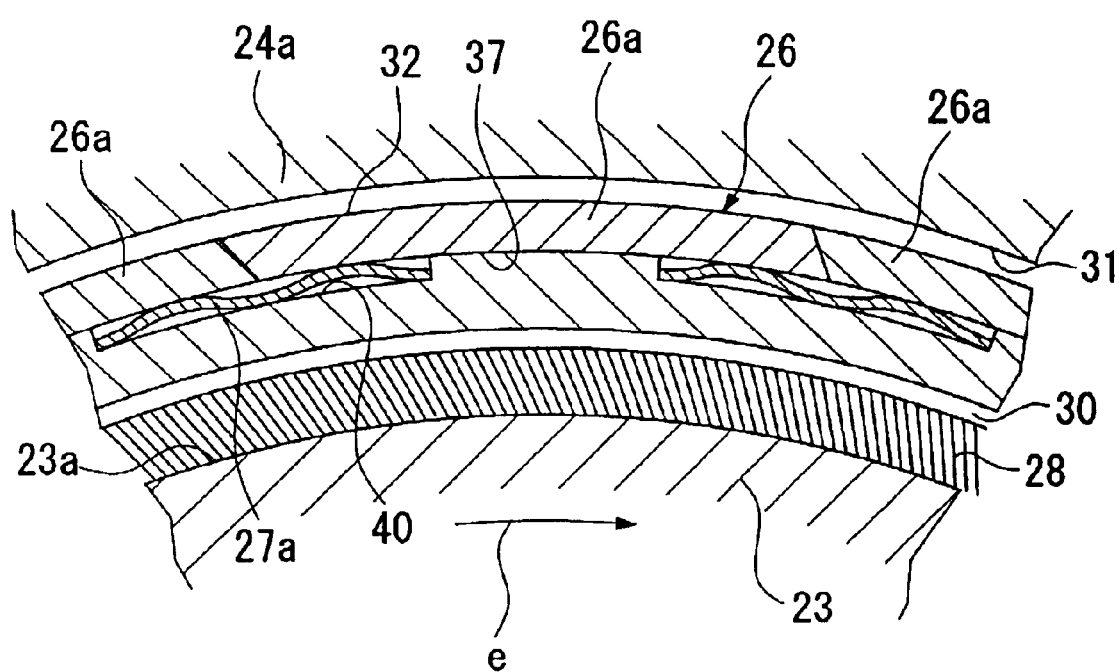
FIG. 5 is a cross section of a brush seal according to the present embodiment taken along line Y—Y in FIG. 4.
Figure 6:
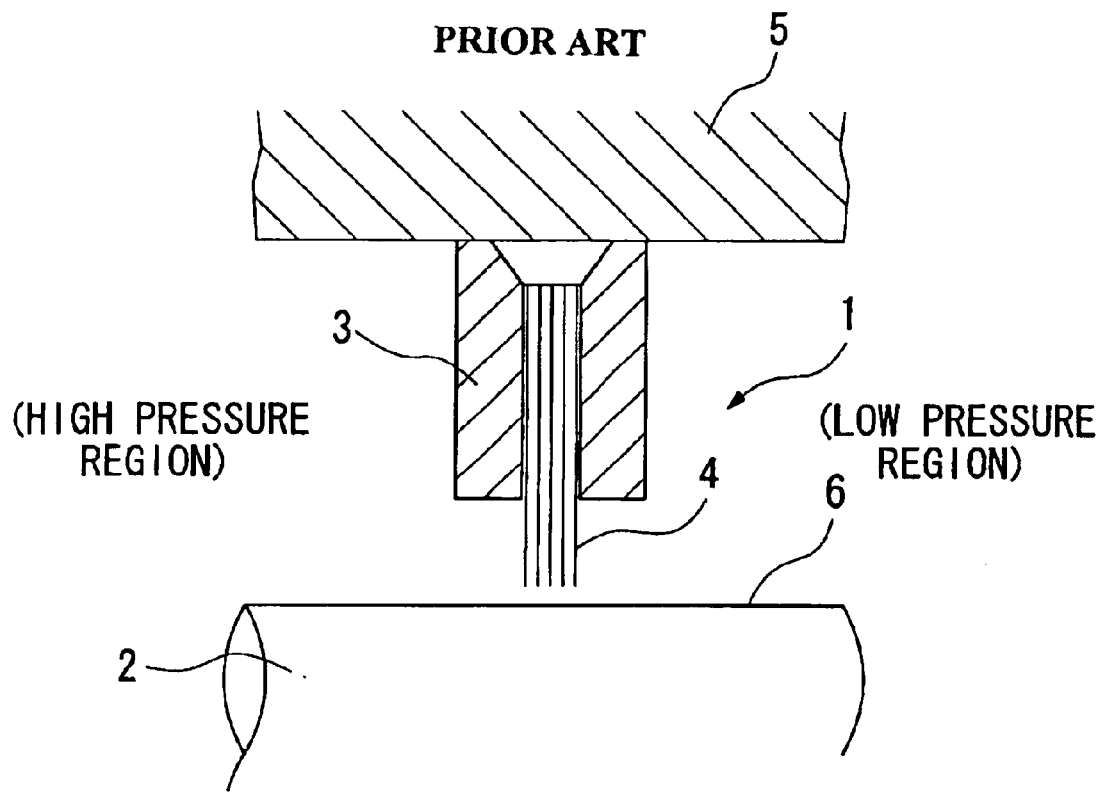
FIG. 6 is a view showing a general structure of a conventional seal structure for a rotating shaft.
Figure 7:
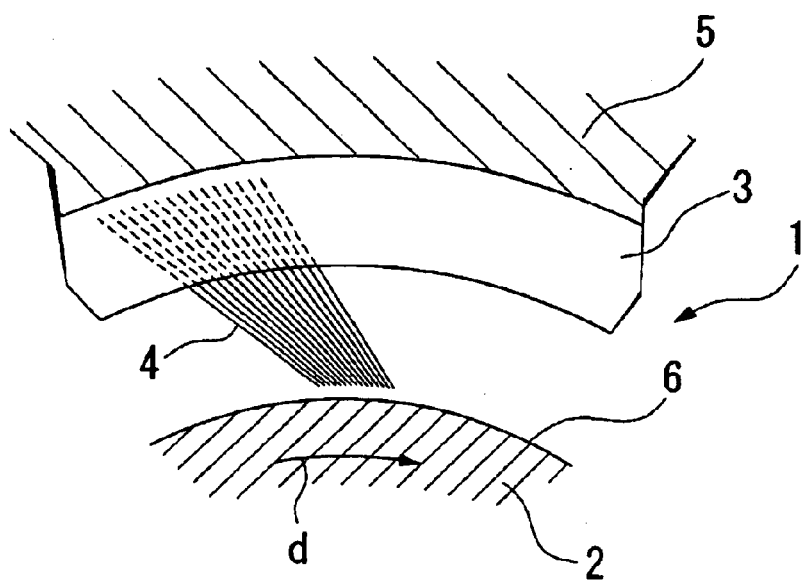
FIG. 7 is a cross section of a conventional seal structure for a rotating shaft viewed from an arrow I.
Figure 8:
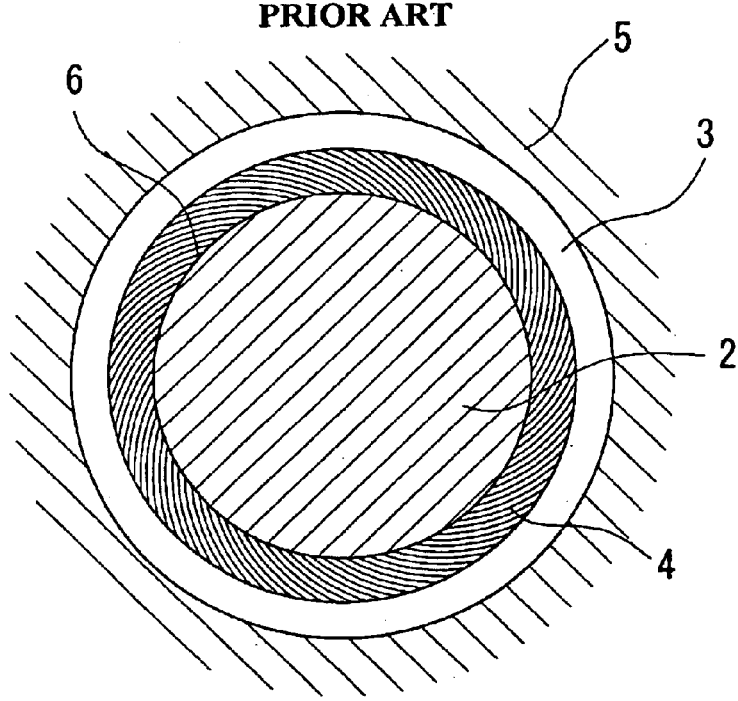
FIG. 8 is a cross section of a conventional seal structure for a rotating shaft.
Figure 9:
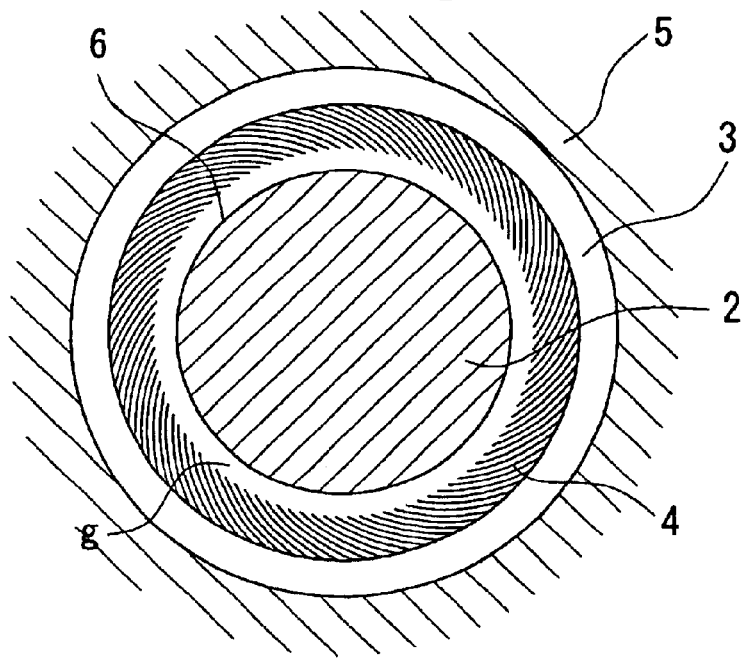
FIG. 9 is a cross section of a conventional seal structure for a rotating shaft.

When the turbine 22 is operated in a load condition, pressurized air from the pressure induction device 39 (compressed fluid) is supplied to the connecting hole 38. The fluid pressure of the gas works to the pressure receiving section 33 of the ring 26 and the upper surface 32. As shown in FIG. 4, the fluid pressure of the gas presses the ring 26 in a radial inner direction of the rotating shaft 23 (in a direction indicated by "C" in the drawing) so as to oppose the spring force by the plate springs 27a and 27b. When fluid pressure becomes high, the ring 26 moves toward the rotating shaft 23. The fluid pressure is intensified until it overcomes the spring force of the plate springs 27a and 27b while the turbine 22 operates in a standard condition. When the spring force of the plate springs 27a and 27b is overcome, as shown in FIG. 5, a bottom surface 37 of the outer peripheral section 29 of the ring 26 contacts the stator 24a. When the ring 26 moves until the bottom surface 37 of the outer peripheral section 29 and the stator 24a contact, the tip of the brush 28 contacts the rotational surface 23a of the rotating shaft 23. Accordingly, in this brush seal 25, the brush 28 slides on the rotational surface 23a of the rotating shaft 23 when the turbine 22 operates in standard condition.

Also, as shown in FIG. 4, when gas flows in an axial direction of the rotating shaft 23 (in a direction indicated by an arrow D), the inner peripheral suction 30 of the ring 26 is compressed toward a low pressure region (in a direction indicated by an arrow E) by this gas; thus, a surface 41 near a low pressure region of the outer peripheral section 29 is compressed on a surface of a wall of the groove section 31. Therefore, gas which is supplied from the connecting hole 38 never flows between the surface 41 near a low pressure region of the ring 26 and the surface of the wall of the groove section 31 and never leaks to a low pressure region. Also, the space between the surface 34 near a high pressure region of the ring 26 and the surface of the wall of the groove section 31 is sealed by the seal member 35; thus, the gas from the connecting hole 38 never flows between the surface 34 near the high pressure region and the wall surface of the groove section 31 and never leaks to the low pressure region. Also, gas which intrudes into the groove section 31 from the space between the ring 26 and the groove 31 is blocked by the seal member 35; thus, the gas never flow inside the groove section 31 and never leaks to the low pressure region.

Furthermore, when gas flows in an axial direction of the rotating shaft 23, the inner peripheral section 30 of the ring 26 is compressed from a high pressure region to a low pressure region by the gas. Consequently, a force acts to lift up a portion near a low pressure region of each portion 26a forming the ring 26 so as to rotate each portion 26a. However, a force which lifts up a portion near high pressure region acts on each portion 26a due to a difference of the spring force between a plate spring 27a disposed in a high pressure region and other plate spring 27b disposed in a low pressure region. Therefore, forces which rotate each portion 26a are counterbalanced. Therefore, when gas flows in an axial direction of the rotating shaft 23, rotating force does not act on each portion 26a; thus, each portion 26a does not slant nor vibrate in the groove section 31.

According to a brush seal 25 having the above structure, when a turbine 22 operates in a no-load condition, the ring 26 floats in a direction in which the ring 26 leaves from the rotating shaft 23 in the groove section 31 of the stator 24a by each plate spring 27a and 27b; thus, the brush 28 disposed on the ring 26 and the rotational surface 23a of the rotating shaft 23 are maintained uncontacted. Therefore, when the turbine 22 operates in a no-load condition, the friction between the brush 28 and the rotating shaft 23 is prevented.

Also, when the turbine 22 operates in a load condition, the ring 26 is compressed in the inner radial direction of the rotating shaft 23 by fluid pressure inducted from the connecting hole 28, and the spring force of each plate spring 27a and 27b is counterbalanced; thus, the tip of the brush 28 contacts the rotational surface 23a of the rotating shaft 23 with a predetermined pressure. By doing this, the amount of gas leaking which flows between the rotating shaft 23 and the brush 28 and leaking from the high pressure region to the low pressure region decreases.

Also, according to the brush seal 25, to oppose a force which lifts a part of the portion 26a nearer to a low pressure region and rotates the portion 26a, the spring force of the plate spring 27a disposed in a high pressure region is made larger than the spring force of the other plate spring 27b disposed in a low pressure region. Thus, a force which lifts a part of portion 26a nearer to a high pressure region is given so as to counterbalance the rotating force acting on the portion 26a. Therefore, when a turbine 22 operates in a load condition, a portion 26a is never fixed slanted in the groove section 31, the ring 26 moves smoothly in a direction in which the ring 26 approaches toward the rotating shaft 23 due to the fluid pressure acting to the pressure receiving section 33 and the upper surface 34 of the ring 26. By doing this, when the turbine 22 operates in a load condition, a space can be prevented from being generated between the brush 28 and the rotational surface 23a of the rotating shaft 23.

As described above, in a brush seal 25, when a turbine 22 operates in a no-load condition in which a space between the rotating shaft 23 and the stator 24a does not need to be sealed, the contact between the brush 28 and the rotating shaft 23 is avoided. Thus, the fatigue life of the brush seal 25 can be extended. Also, in the turbine 22 which is provided with the brush seal 25, when a turbine 22 operates in a load condition in which a space between the rotating shaft 23 and the stator 24a must be sealed, the gas leak in an axial direction of the rotating shaft 23 can be prevented; thus the loss of driving force can be prevented from occurring.

What is claimed is:

1. A sealing structure for preventing a fluid from flowing from a high pressure to a low pressure region between a rotating shaft and a stator, the sealing structure comprising:

a stator section having a groove on an inner surface thereof;

the rotating shaft having a surface;

a ring made of a plurality of portions formed in a circle and disposed in the groove;

a seal disposed between a surface of the groove and the ring on the high pressure region configured to prevent a gas from a connecting hole to flow there between;

a brush comprised of a plurality of wires attached at an inner surface of the ring, wherein tips of the plurality of wires are disposed toward at least a portion of the inner surface;

a spring member which pushes the ring in a direction in which the ring departs from the rotating shaft so as to float the brush from the inner surface of the stator; and the connecting hole which induces fluid pressure which presses the ring in a direction in which the ring approaches the rotating shaft so as to be against a spring force of the spring member and make the brush contact the inner surface of the stator, wherein the sealing structure prevents the fluid from running between the rotating shaft and the stator in an axial direction of the rotating shaft and has a clearance from the surface of the rotating shaft.

2. A sealing structure for a rotating shaft, according to claim 1, wherein the sealing structure has a pressure inducing device which induces the fluid pressure to the connecting hole.

3. A sealing structure for a rotating shaft, according to claim 1 or 2, wherein the spring member is disposed separately near an upstream of the fluid and near a downstream of the fluid so as to dispose the brush therebetween.

4. A sealing structure for a rotating shaft, according to claim 3, wherein the spring member further comprises at least a first and a second spring member, and the spring force of the at least first spring member disposed near an upstream of the fluid is greater than the spring force of the at least second spring member disposed near a downstream of the fluid at the brush as a border.

5. A turbine which is provided with a rotating shaft seal structure according to claim 1 or 2 wherein the turbine converts thermal energy to mechanical rotary energy so as to generate a dynamic force by expanding high temperature high pressure fluid to rotors disposed on the rotating shaft so as to rotate the rotors around the rotating shaft.

6. A leak-preventing seal system for preventing a fluid from flowing from a high pressure to a low pressure region between a rotating shaft and a stator, the leak-preventing seal system comprising:

a ring made of a plurality of circular portions which are disposed on a rotor, said ring having the rotating shaft therethrough and being made of a plurality of portions formed in circles and disposed in a groove;

a seal, disposed between a surface of the groove and the ring on the high pressure region, being configured to prevent a gas from a connecting hole to flow between the groove and the ring, a brush composing a plurality of wires attached to an inner surface of the ring, wherein tips of the wires are disposed toward at least a portion of the inner surface;

a spring member which pushes the ring in a direction in which the ring departs from the rotating shaft; and the connecting hole for inducing fluid pressure to press the ring in a direction in which the ring approaches the rotating shaft so as to be against a spring force of the spring member, wherein the leak-preventing seal system for rotating shaft prevents the fluid from flowing between the rotating shaft and the stator in an axial direction of the rotating shaft and has a clearance from the surface of the rotating shaft; and wherein the leak-preventing seal system for rotating shaft supplies the fluid pressure to the connecting hole when sealing the clearance and stops the supply of the fluid pressure to the connecting hole when releasing the sealing of the clearance.

* * * * *